(12) United States Patent
Hou et al.

(10) Patent No.: US 11,725,944 B2
(45) Date of Patent: Aug. 15, 2023

(54) METHOD, APPARATUS, COMPUTING DEVICE AND COMPUTER-READABLE STORAGE MEDIUM FOR POSITIONING

(71) Applicant: APOLLO INTELLIGENT DRIVING TECHNOLOGY (BEIJING) CO., LTD., Beijing (CN)

(72) Inventors: Shenhua Hou, Beijing (CN); Wendong Ding, Beijing (CN); Hang Gao, Beijing (CN); Guowei Wan, Beijing (CN); Shiyu Song, Beijing (CN)

(73) Assignee: APOLLO INTELLIGENT DRIVING TECHNOLOGY (BEIJING) CO, LTD., Beijing (CN)

( * ) Notice: Subject to any disclaimer, the term of this patent is extended or adjusted under 35 U.S.C. 154(b) by 602 days.

(21) Appl. No.: 16/806,331

(22) Filed: Mar. 2, 2020

(65) Prior Publication Data
US 2021/0270609 A1   Sep. 2, 2021

(51) Int. Cl.
*G01C 21/30* (2006.01)
*G01S 17/89* (2020.01)
*G01S 17/06* (2006.01)
(Continued)

(52) U.S. Cl.
CPC ....... *G01C 21/165* (2013.01); *G01C 21/1652* (2020.08); *G01C 21/30* (2013.01);
(Continued)

(58) Field of Classification Search
CPC .. G01C 21/165; G01C 21/1652; G01C 21/30; G01C 21/3804; G01C 21/3602;
(Continued)

(56) References Cited

U.S. PATENT DOCUMENTS 9,052,721 B1 * 6/2015 Dowdall ............... B64D 45/00
2016/0335901 A1   11/2016 Singh et al.
(Continued)

FOREIGN PATENT DOCUMENTS

CN   107144292 A   9/2017
CN   108731699 A   11/2018
(Continued)

OTHER PUBLICATIONS

Wan et al, "Robust and Precise Vehicle Localization based on Multi-sensor Fusion in Diverse City Scenes," in *2018 IEEE International Conference on Robotics and Automation*, Brisbane, Australia, May 21-25, 2018, pp. 4670-4677.
(Continued)

*Primary Examiner* — Peter D Nolan
*Assistant Examiner* — Anwar Mohamed
(74) *Attorney, Agent, or Firm* — Seed IP Law Group LLP

(57) ABSTRACT

The present disclosure provides a method, an apparatus, a computer device and a computer-readable storage medium for positioning, and relates to the field of autonomous driving. The method obtains inertial measurement data of a device to be positioned at a current time and point cloud data collected by a LiDAR on the device at the current time; determines, by integrating the inertial measurement data, inertial positioning information of the device in an inertial coordinate system at the current time; and determines, based on the inertial positioning information, the point cloud data and at least one local map built in a local coordinate system, a positioning result of the device in the local coordinate system at the current time. Techniques of the present disclosure can provide an effective and stable local positioning result.

18 Claims, 4 Drawing Sheets

(51) Int. Cl.
*G01C 21/16* (2006.01)
*G01C 21/00* (2006.01)

(52) U.S. Cl.
CPC .......... *G01C 21/3804* (2020.08); *G01S 17/06* (2013.01); *G01S 17/89* (2013.01)

(58) Field of Classification Search
CPC ................ G01C 21/32; G01C 21/3863; G01C 21/3885; G01S 17/06; G01S 17/89; G01S 7/4808; G01S 17/86; G01S 17/42; G06T 7/73; G06T 2207/10028; G01P 15/02; G06Q 50/30
See application file for complete search history.

(56) References Cited

U.S. PATENT DOCUMENTS

| | | | |
|---|---|---|---|
| 2018/0088234 A1 | 3/2018 | Scherer et al. | |
| 2018/0216942 A1* | 8/2018 | Wang | G01S 7/4808 |
| 2018/0299557 A1 | 10/2018 | Yi et al. | |
| 2019/0171212 A1* | 6/2019 | Wang | G05D 1/0274 |
| 2020/0150233 A1* | 5/2020 | Nian | G01S 7/4808 |
| 2021/0004021 A1* | 1/2021 | Zhang | G06V 10/764 |

FOREIGN PATENT DOCUMENTS

| | | |
|---|---|---|
| CN | 109144056 A | 1/2019 |
| CN | 109425348 A | 3/2019 |
| CN | 110070577 A | 7/2019 |
| CN | 110501712 A | 11/2019 |
| CN | 110553648 A | 12/2019 |
| JP | 2014102137 A | 6/2014 |
| JP | 2019040445 A | 3/2019 |
| KR | 10-2016-0057755 A | 5/2016 |
| KR | 10-2017-0093608 A | 8/2017 |
| KR | 10-2019-0041315 A | 4/2019 |
| WO | WO 2018008082 A1 | 1/2018 |
| WO | WO 2019215987 A1 | 11/2019 |

OTHER PUBLICATIONS

Ye et al, "Tightly Coupled 3D Lidar Inertial Odometry and Mapping," in *2019 International Conference on Robotics and Automation*, Palais des congress de Montreal, Montreal, Canada, May 20-24, 2019, pp. 3144-3150.

* cited by examiner

METHOD, APPARATUS, COMPUTING DEVICE AND COMPUTER-READABLE STORAGE MEDIUM FOR POSITIONING

FIELD

Embodiments of the present disclosure mainly relate to the field of autonomous driving, and more specifically to a method, an apparatus, a computer device and a computer-readable storage medium for positioning.

BACKGROUND

As an application scenario of the artificial intelligence, autonomous driving (also known as unmanned driving) has recently become a new direction for various transportation means, especially automobile industry. The autonomous driving technology usually relies on high-precision positioning of autonomous vehicles. In the autonomous driving field, traditional positioning schemes usually determine a location of an autonomous vehicle by matching point cloud data collected in real time by a LiDAR on the autonomous vehicle with a high-precision positioning map. However, when the road environment changes, the point cloud data collected in real time may greatly differ from the data of a corresponding area in the positioning map, which results in inaccurate positioning results or failure of positioning. The laser odometry is not affected by the environmental change, since it does not use the high-precision positioning map.

SUMMARY

In accordance with example embodiments, there is provided a solution for positioning.

In a first aspect of the present disclosure, there is provided a method for positioning. The method comprises obtaining inertial measurement data of a device to be positioned at a current time and point cloud data collected by a LiDAR on the device at the current time; determining, by integrating the inertial measurement data, inertial positioning information of the device in an inertial coordinate system at the current time; and determining, based on the inertial positioning information, the point cloud data and at least one local map built in a local coordinate system, a positioning result of the device in the local coordinate system at the current time.

In a second aspect of the present disclosure, there is provided an apparatus for positioning. The apparatus comprises a data obtaining module configured to obtain inertial measurement data of a device to be positioned at a current time and point cloud data collected by a LiDAR on the device at the current time; an inertial positioning module configured to determine, by integrating the inertial measurement data, inertial positioning information of the device in an inertial coordinate system at the current time; and a result determining module configured to determine, based on the inertial positioning information, the point cloud data and at least one local map built in a local coordinate system, a positioning result of the device in the local coordinate system at the current time.

In a third aspect of the present disclosure, there is provided a computing device comprising one or more processors; and a memory for storing one or more programs, wherein the one or more programs, when executed by the one or more processors, cause the computing device to perform the method according to the first aspect of the present disclosure.

In a fourth aspect of the present disclosure, there is provided a computer-readable storage medium having stored thereon a computer program that, when executed by a device, causes the device to perform the method according to the first aspect of the present disclosure.

It is to be understood that the content described in the Summary of the present disclosure is not intended to define key or essential features of embodiments of the present disclosure, nor is it intended to limit the scope of the present disclosure. Other features of the present disclosure will be easily understood by the following depictions.

BRIEF DESCRIPTION OF THE DRAWINGS

In conjunction with the accompanying drawings and with reference to the following detailed description, the above and other features, advantages, and aspects of embodiments of the present disclosure will become more apparent. In the drawings, identical or like reference numbers denote identical or like elements, in which.

DETAILED DESCRIPTION OF EMBODIMENTS

Figure 1:
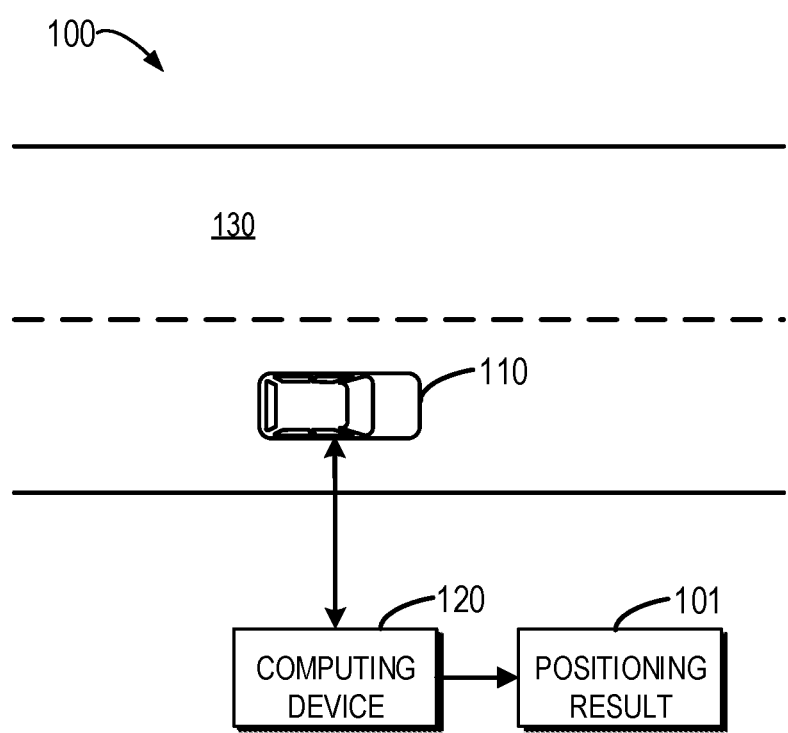
FIG. 1 illustrates a schematic diagram of an example environment in which embodiments of the present disclosure can be implemented.

Hereinafter, embodiments of the present disclosure will be described in more detail with reference to the accompanying drawings. Although some embodiments of the present disclosure are illustrated in the drawings, it is to be understood that the present disclosure may be implemented in various manners and should not be interpreted as being limited to the embodiments illustrated herein. On the contrary, these embodiments are only intended to understand present disclosure more thoroughly and completely. It is to be understood that the accompanying drawings and embodiments of the present disclosure are only for the purpose of illustration, without suggesting any limitation to the protection scope of the present disclosure.

As described in embodiments of the present disclosure, the terms "includes", "comprises" and its variants are to be read as open-ended terms that mean "includes, but is not limited to." The term "based on" is to be read as "based at least in part on." The term "one embodiment" or "the embodiment" should be understood as "at least one embodiment". The terms "first", "second", etc. may refer to different or the same objects. The following text also can include other explicit and implicit definitions.

As mentioned above, in the autonomous driving field, traditional positioning schemes usually determine a location of an autonomous vehicle by matching point cloud data collected in real time by a LiDAR on the autonomous vehicle with a high-precision positioning map. However, when road environment changes, the point cloud data collected in real time may greatly differ from the data of a corresponding area in the positioning map, which results in inaccurate positioning results or failure of positioning.

In accordance with embodiments of the present disclosure, there is provided a solution for positioning. This solution includes obtaining inertial measurement data of a device to be positioned at a current time and point cloud data collected by a LiDAR on the device at the current time; determining, by integrating the inertial measurement data, inertial positioning information of the device in an inertial coordinate system at the current time; and determining, based on the inertial positioning information, the point cloud data and at least one local map built in a local coordinate system, a positioning result of the device in the local coordinate system at the current time.

Compared with the traditional schemes, embodiments of the present disclosure have following advantages: first, instead of the two-dimensional (2D) occupancy grid map used in the traditional schemes, embodiments of the present disclosure adopt a three-dimensional (3D) occupancy grid map as a local map for matching with the point cloud data, thereby implementing a full 6 Degrees of Freedom (DOFs) radar inertial odometry; second, embodiments of the present disclosure provide relative constraints for pose estimates between frames using the integration result of the inertial measurement data and simultaneously implement motion compensation for the radar scan distortion caused by motion; third, the LiDAR reflection information is incorporated into the grid of the local map and the LiDAR reflection information is utilized when the local map is matching with the current frame; fourth, local maps with different resolutions are introduced to improve stability and precision for the matching process between the point cloud data and the local maps.

Embodiments of the present disclosure will be specifically described below with reference to the drawings. FIG. 1 illustrates a schematic diagram of an example environment 100 in which embodiments of the present disclosure can be implemented. The environment 100 may include a device 110 to be positioned and a computing device 120 communicatively coupled to the device 110.

In this example environment 100, the device 110 is shown as a vehicle, which is for example driving on a road 130. The vehicle described herein may include, but is not limited to, a car, a truck, a bus, an electric vehicle, a motorcycle, a motor home, a train and the like. In some embodiments, the device 110 may be a vehicle with partially or fully autonomous driving capabilities, also referred to as an unmanned vehicle. Alternatively, in other embodiments, the device 110 may also be other devices or transportation vehicles to be positioned. The scope of the present disclosure is not limited in this regard.

The device 110 may be communicatively coupled to the computing device 120. Although shown as a separate entity, the computing device 120 may be embedded in the device 110. The computing device 120 may also be implemented as an entity external to the device 110 and may communicate with the device 110 via a wireless network. The computing device 120 may include at least a processor, a memory, and other components generally present in a general-purpose computer, so as to implement functions such as computing, storage, communication, control and so on.

In some embodiments, the device 110 may be equipped with a LiDAR for collecting point cloud data in real time. The computing device 120 may obtain point cloud data collected by the LiDAR in real time from the device 110, and determine a current positioning result 101 of the device 110 based on at least the point cloud data. The positioning result 101 may indicate a pose of the device 110 in a specific coordinate system. For example, in a two-dimensional coordinate system, the pose of an object may be represented with two-dimensional coordinates and a heading angle. In a three-dimensional coordinate system, the pose of an object may be represented with three-dimensional coordinates, a pitch angle, a heading angle and a roll angle. Additionally, in some embodiments, the device 110 may also be equipped with an inertial measurement unit (IMU) for collecting inertial measurement data, such as angular velocity collected by a gyroscope, a zero offset of the gyroscope, acceleration collected by an accelerator and a zero offset of the accelerator, in real time. The computing device 120 may obtain the inertial measurement data and the point cloud data collected by the LiDAR in real time from the device 110, and determine the current positioning result 101 of the device 110 based on at least the inertial measurement data and the point cloud data.

Figure 2:
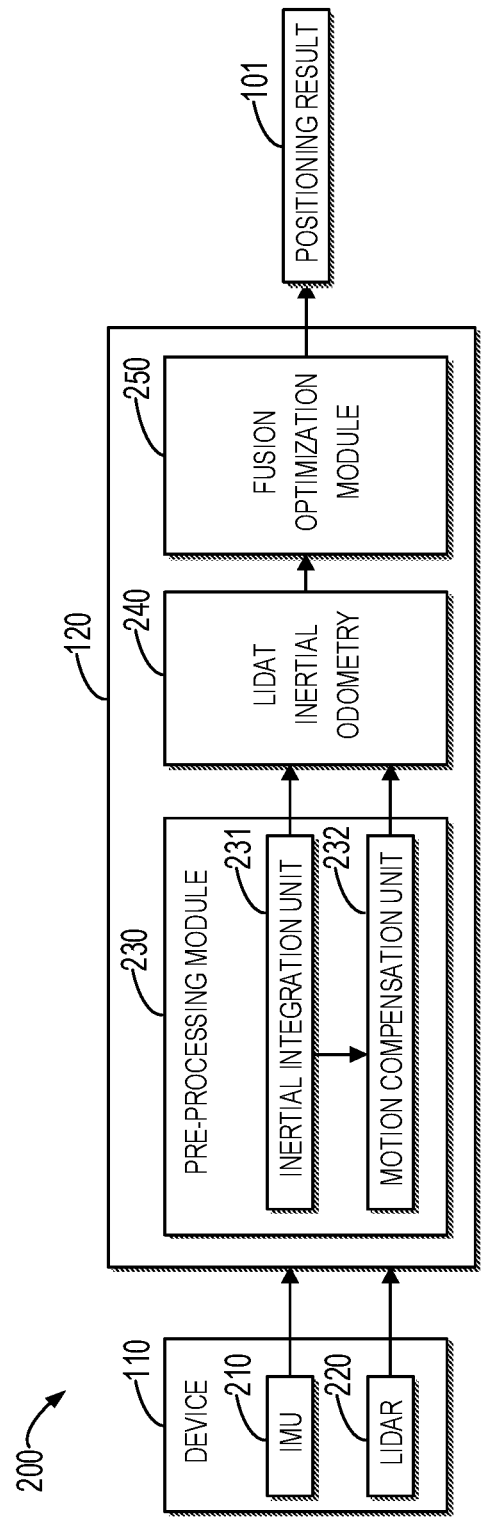
FIG. 2 illustrates a block diagram of a positioning system according to embodiments of the present disclosure.

FIG. 2 illustrates a block diagram of a positioning system 200 according to embodiments of the present disclosure. It should be understood that the structure and function of the positioning system 200 are shown merely for the purpose of illustration, without suggesting any limitation to the scope of the present disclosure. In some embodiments, the positioning system 200 may have different structures and/or functions.

As shown in FIG. 2, the system 200 may include the device, e.g., a vehicle, 110 to be positioned and the computing device 120. The device 110 to be positioned for example may include an IMU 210 and a LiDAR 220. The IMU 210, for example, including a gyroscope, an accelerometer, and etc., may collect inertial measurement data of the device 110, such as angular velocity collected by the gyroscope, a zero offset of the gyroscope, acceleration collected by the accelerator, a zero offset of the accelerator, and etc., in real time, and the LiDAR 220 may collect point cloud data in real time. As used herein, the "point cloud data" refers to data information of various points on the surface of an object returned when a laser beam is irradiated on the surface of the object, including three-dimensional coordinates (for example, x, y and z coordinates) and laser reflection intensity, also referred to as "reflection value" or "reflection information", of each point.

According to FIG. 2, the computing device 120 may include a pre-processing module 230, a LiDAR inertial odometry 240 and a fusion optimization module 250. It is to be understood that the various modules of the computing device 120 and their functions are shown only for the purpose of illustration, without suggesting any limitation to the scope of the present disclosure. In some embodiments, the computing device 120 may include an additional module, or one or more of the modules as shown, e.g., the fusion optimization module 250, may be omitted.

In some embodiments, the pre-processing module 230 may include an inertial integration unit 231 and a motion compensation unit 232. The inertial integration unit 231 may integrate the inertial measurement data collected by the IMU 210 to determine positioning information, also referred to herein as "inertial positioning information", of the device 110 in an inertial coordinate system at the current time. The inertial positioning information, for example, may indicate a predicted pose and/or other information of the device 110 in the inertial coordinate system. In some embodiments, the inertial positioning information may be provided to the motion compensation unit 232, which may perform motion compensation on the original point cloud data collected by the LiDAR 220 using the inertial positioning information to obtain the compensated point cloud data. The compensated point cloud data may be provided to the LiDAR inertial odometry 240.

In some implementations, the LiDAR inertial odometry 240 may receive the point cloud data (e.g., the motion-compensated point cloud data or the original point cloud data) and the inertial positioning information, and estimate a relative pose relationship between the point cloud data at the current time (also referred to as "a current frame") and the point cloud data at a previous time (also referred to as "a previous frame") based on the point cloud data and the inertial positioning information. In some embodiments, the LiDAR inertial odometry 240 may construct a local map in the local coordinate system by combining the received point cloud data based on the estimated relative pose relationships among different frames of the point cloud data. The local map, for example, may be a 3D occupancy grid map constructed in the local coordinate system which takes an initial location of the device 110 as the origin. For instance, the local map may be divided into a plurality of grids and each grid may record the laser reflectance information, e.g., the mean and variance of laser reflection values, corresponding to the grid and a probability of how likely the grid is occupied by an obstacle, which is also referred to as "occupancy probability" or "obstacle occupancy probability".

In some embodiments, the LiDAR inertial odometry 240 may determine, by matching the point cloud data with the local map and using the inertial positioning information as a constraint, the positioning result 101 of the device 110 in the local coordinate system at the current time. The positioning result 101, for example, may indicate a relative pose between the point cloud data and the local map, a pose of the device 110 in the local coordinate system, also referred to as a "first pose" herein, and a pose of the local map in the local coordinate system, also known as a "second pose" herein. The pose of the local map may be represented, for example, by the pose corresponding to the first frame of point cloud used to construct the local map.

In some embodiments, the LiDAR inertial odometry 240 may further update the local map based on the point cloud data at the current time. Since the point cloud data and the local map are usually not in the same coordinate system, the LiDAR inertial odometry 240 may first transform the point cloud data to the local coordinate system corresponding to the local map, and then update the local map with the coordinate-transformed point cloud data. For example, the LiDAR inertial odometry 240 may insert the point cloud data of the current time into the local map to update the local map.

In some embodiments, the LiDAR inertial odometry 240 may maintain a plurality of local maps. For example, it is assumed that the LiDAR inertial odometry 240 has built a first local map by combining a plurality of frames of historical point cloud data. Upon receiving the point cloud data of the current time, the LiDAR inertial odometry 240 may insert the point cloud data of the current time into the first local map to update the first local map. If the number of point cloud frames in the first local map reaches a threshold, for example, 40 frames, subsequent point cloud data will not be inserted into the first local map and will be used to construct a new second local map. If the number of point cloud frames in the second local map reaches a threshold, for example, 40 frames, the first local map may be discarded. In some embodiments, the plurality of local maps maintained by the LiDAR inertial odometry 240 may have different resolutions, thereby further improving the accuracy and stability of positioning. In some embodiments, when the LiDAR inertial odometry 240 maintains a plurality of local maps, the pose of each local map in the local coordinate system may be represented by the pose corresponding to the first frame of point cloud used to construct the local map. Upon determining the positioning result 101 of the device 110 in the local coordinate system, the LiDAR inertial odometry 240 may match the received point cloud data with each of the plurality of local maps.

In some embodiments, the determination of the positioning result 101 may be formulated as a maximum posterior estimation problem. For example, a posterior probability P(X|Z) corresponding to the positioning result of the device 110 may be decomposed as follows:

$$P(x_k^L | z_k, x_{k-1}^L, S_{k-1}) \propto P(z_k^P | x_k^L, S_{k-1}) \\ P(z_k^I | x_k^L, x_{k-1}^L), \quad (1)$$

where assuming K represents the set of all frames, $X\{x_k\}_{k \in K}$ represents states (e.g., positioning results) of these frames and $Z=\{z_k\}_{k \in K}$ represents measurement data related to these frames. The variable $x_k^L=[R_k^L, t_k^L]$ represents a state (e.g., pose) of the $k^{th}$ frame in the local coordinate system, where $R_k^L$ represents a pitch angle, a heading angle, and a roll angle corresponding to the $k^{th}$ frame in the local coordinate system, and $t_k^L$ represents three-dimensional position coordinates of the $k^{th}$ frame in the local coordinate system. $z_k=\{z_k^P, z_k^I\}$ represents measurement data related to the $k^{th}$ frame, where $z_k^P$ represents the point cloud data of the $k^{th}$ frame and $z_k^I$ represents the inertial positioning information of the $k^{th}$ frame in the inertial coordinate system provided by the inertial integration unit 231. The variable $x_{k-1}^L$ represents a state, e.g., pose, of the $(k-1)^{th}$ frame in the local coordinate system and $S_{k-1}$ represents at least one local map updated with the $(k-1)^{th}$ frame, e.g., the at least one local map to be matched with the current frame.

In some embodiments, as described in the above equation (1), the LiDAR inertial odometry 240 may determine, based on the historical positioning result $x_{k-1}^L$ of the device 110 at a historical time, the point cloud data $z_k^P$, the inertial positioning information $z_k^I$ and the at least one local map a posterior probability $P(x_k^L|z_k, x_{k-1}^L, S_{k-1})$ associated with the positioning result $x_k^L$ (also referred to as a "first posterior probability" herein). Then, the positioning result $x_k^L$ may be determined by maximizing the posterior probability $P(x_k^L|z_k, x_{k-1}^L, S_{k-1})$. In some embodiments, in order to determine the first posterior probability $P(x_k^L|z_k, x_{k-1}^L, S_{k-1})$, the LiDAR inertial odometry 240 may determine a likelihood value $P(z_k^P|x_k^L, S_{k-1})$, also referred to as a "first likelihood value" herein, of the point cloud data $z_k^P$ with respect to the positioning result $x_k^L$ and the at least one local map $S_{k-1}$. The LiDAR inertial odometry 240 may determine a likelihood value $P(z_k^I|x_k^L, x_{k-1}^L)$, also referred to as a "second likelihood value" herein, of the inertial positioning information $z_k^I$ with respect to the positioning result $x_k^L$ and the historical positioning result $x_{k-1}^L$. Then, the LiDAR inertial odometry 240 may determine the first posterior probability $P(x_k^L|z_k, x_{k-1}^L, S_{k-1})$ based on the first likelihood value and the second likelihood value.

In some embodiments, under the assumption of a zero-mean Gaussian distribution, the second likelihood value $P(z_k^I|x_k^L, x_{k-1}^L)$ may be defined as:

$$P(z_k^I | x_k^L, x_{k-1}^L) \propto \exp - \frac{1}{2} \|r_k^I\|_{\Lambda_k^I}^2, \quad (2)$$

where $\|r\|_A^2 = r^T \Lambda^{-1} r$, $r_k^I$ represents a residual of the inertial positioning information and $\Lambda_k^I$ represents a covariance of the residual $r_k^I$ in the inertial coordinate system. In some embodiments, the residual $r_k^I$ of the inertial positioning information and its covariance $\Lambda_k^I$ can be determined by using any method currently known or to be developed in the future, which will not be described in detail herein.

In some embodiments, the first likelihood value $P(z_k^P | x_k^L, S_{k-1})$ may be defined as:

$$P(z_k^P | x_k^L, S_{k-1}) \propto \prod_i \prod_j \exp - \frac{1}{2\sigma_{o_i}^2} \|SSOP\|^2 \qquad (3)$$
$$\prod_i \prod_j \exp - \frac{1}{2\sigma_{r_i}^2} \|SSID\|^2,$$

where the occupancy probability item SSOP and the reflection value item SSID may be respectively defined as:

$$\begin{cases} SSOP = 1 - P(s) \\ SSID = \dfrac{u_s - I(p_j)}{\sigma_s} \end{cases} \qquad (4)$$

The local map $S_{k-1}$ may represent a plurality of local maps having different resolutions, wherein i in the above equation (3) represents the resolution of a local map. Each local map may be a 3D occupancy grid map, where an index of a grid is denoted by j. The point cloud data, for example, may include respective reflection values of a plurality of laser points. Given one laser point $p_j \in \mathbb{R}^3$ and a local map with a resolution i, a grid s hit by the laser point in the local map can be determined. In the above equation (4), P(s) represents an occupancy probability of the grid s in the local map; $I(p_j)$ represents a reflection value of the laser point PI in the point cloud data; and $u_s$ and $\sigma_s$ respectively indicate the mean and variance of reflection values of the grid s in the local map. The variances $\sigma_{o_i}$ and $\sigma_{r_i}$ in the equation (3) are provided for weighting the occupancy probability items and the reflection value items associated with local maps of different resolutions during the estimation of the maximum posterior probability.

In some embodiments, the LiDAR inertial odometry 240 may determine the positioning result 101 of the device 110 at the current time by maximizing the posterior probability as shown in the equation (1). In some embodiments, the positioning result 101, for example, may indicate a pose $x_k^L$ of the device 110 at the current time in the local coordinate system. In order to solve the maximum posterior estimation problem shown in the equations (1)-(4), the problem can be transformed into another problem for finding a minimum value of the sum of squares of the residual, the occupancy probability item and the reflection value item, and then can be solved by using an iterative algorithm. In this way, the LiDAR inertial odometry 240 can determine the positioning result 101 of the device 110 at the current time.

Additionally or alternatively, in some embodiments, in response to the positioning result 101 being determined by the LiDAR inertial odometry 240, the fusion optimization module 250 may optimize the positioning result based on at least the inertial positioning information from the inertial integration unit 231. The optimized positioning result 101, for example, may indicate an optimized pose $x_k^L$ of the device 110 at the current time in the local coordinate system.

In some embodiments, the fusion optimization process may utilize a sliding window of a fixed length. For example, in the case that the number of frames in the sliding window reaches a predetermined frame number, the oldest frame of point cloud data within the sliding window may be removed when a new frame of point cloud data enters the sliding window. In other words, the sliding widow for the fusion optimization process always includes point cloud data at the current time, e.g., the current frame, and point cloud data at historical times prior to the current time. In some embodiments, the fusion optimization module 250 may use the positioning result from the LiDAR inertial odometry 240 and the inertial positioning information from the inertial integration unit 231 as inputs for the sliding window to optimize the positioning result 101 of the device 110 at the current time, e.g., to derive a final pose corresponding to the current frame.

In some embodiments, the fusion problem may be formulated into a maximum posterior estimation problem. For example, a posterior probability P(X|Z) corresponding to the positioning result of the device 110 may be decomposed as follows:

$$P(X|Z) \propto \prod_{k,s} P(z_{ks}^O | x_k^L, x_s^S) \prod_k P(z_k^I | x_k^L, x_{k-1}^L), \qquad (5)$$

where K represents all frames in the sliding window, $X = \{x_k\}_{k \in K}$ represents states of these frames (e.g., positioning results) and $Z = \{z_k\}_{k \in K}$ represents measurement data associated with these frames, including the inertial positioning information provided by the inertial integration unit 231 and the positioning result in the local coordinate system provided by the LiDAR inertial odometry 240. S represents all local maps maintained by the LiDAR inertial odometry 240, where each of the local maps is denoted by s.

In the above equation (5), $z_{ks}^O$ represents a relative pose relationship between the $k^{th}$ frame and the $s^{th}$ local map provided by the LiDAR inertial odometry 240. The variable $x_k^L = [R_k^L, t_k^L]$ represents the state (e.g., pose) of the $k^{th}$ frame in the local coordinate system, where R k represents a pitch angle, a heading angle, and a roll angle corresponding to the $k^{th}$ frame in the local coordinate system and $t_k^L$ represents three-dimensional position coordinates of the $k^{th}$ frame in the local coordinate system. The variable $x_s^S$ represents a state, e.g., pose) of the $s^{th}$ local map in the local coordinate system. It is to be understood that during the fusion optimization process, the variables $x_k^L$ and $x_s^S$ are variable and the relative pose relationship $z_{ks}^O$ may remain unchanged. $P(z_{ks}^O | x_k^L, x_s^S)$ represents a likelihood value, also referred to as a "third likelihood value" herein, of the positioning result provided by the LiDAR inertial odometry 240, e.g., a likelihood value of the relative pose $z_{ks}^O$ with respect to the states $x_k^L$ and $x_s^S$.

In the above equation (5), $z_k^I$ represents the inertial positioning information of the $k^{th}$ frame in the inertial coordinate system provided by the inertial integration unit 231. The variable $x_{k-1}^L$ denotes the state, e.g., pose, of the $(k-1)^{th}$ frame in the local coordinate system. It is to be understood that the variables $x_k^L$ and $x_{k-1}^L$ are variable during the fusion optimization process. $P(z_k^I | x_k^L, x_{k-1}^L)$ represents a likelihood value, also referred to as a "fourth likelihood value" herein, of the inertial positioning information provided by the inertial integration unit 231, e.g., a likelihood value of the inertial positioning information $z_k^I$ with respect to the states $x_k^L$ and $x_{k-1}^L$.

In some embodiments, assuming that each item in the fusion process conforms to a zero-mean Gaussian distribution, the third likelihood $P(z_{ks}^O|x_k^L,x_s^S)$ and the fourth likelihood $P(z_k^I|x_k^L,x_{k-1}^L)$ may respectively be defined as:

$$\begin{cases} P(z_{ks}^O|x_k, x_s^S) \propto \exp-\frac{1}{2}\|r_{ks}^O\|_{\Lambda^O}^2 \\ P(z_k^I|x_k, x_{k-1}) \propto \exp-\frac{1}{2}\|r_k^I\|_{\Lambda_k^I}^2 \end{cases} \quad (6)$$

where $r_{ks}^O$ and $r_k^I$ represent the residuals of the LiDAR inertial odometry 240 and the inertial integration unit 231, respectively, $\Lambda^O$ represents a covariance of the residual $r_{ks}^O$ in the local coordinate system and $\Lambda_k^I$ represents a covariance of the residual $r_k^I$ in the inertial coordinate system.

As mentioned above, the positioning result provided by the LiDAR inertial odometry 240 may indicate a relative pose $z_{ks}^O$ between the point cloud data and the local map, a first pose $x_k^L$ of the device 110 in the local coordinate system at the current time and a second pose $x_s^S$ of the local map in the local coordinate system.

In some embodiments, in order to determine the third likelihood value $P(z_{ks}^O|x_k^L,x_s^S)$, the fusion optimization module 250 may determine an estimate of the relative pose based on the first pose and the second pose provided by the LiDAR inertial odometry 240, and further determine a residual $r_{ks}^O$ between the relative pose $z_{ks}^O$ and the estimate. For example, assuming the relative pose $z_{ks}^O=[R_{ks}^O,t_{ks}^O]$ and the pose of the local map $x_s^S=[R_s^S,t_s^S]$, the residual $(r_{ks}^O)^T=[\text{Log}^T(R_{Ro}),t_{rO}^T]$ may be represented as:

$$\begin{bmatrix} R_{rO} & t_{rO} \\ 0 & 1 \end{bmatrix} = \begin{bmatrix} R_{ks}^O & t_{ks}^O \\ 0 & 1 \end{bmatrix}^{-1} \begin{bmatrix} R_s^S & t_s^S \\ 0 & 1 \end{bmatrix}^{-1} \begin{bmatrix} R_k^L & t_k^L \\ 0 & 1 \end{bmatrix}, \quad (7)$$

where $R_{ks}^O$ represents a relative pitch angle, a relative heading angle and a relative roll angle of the $k^{th}$ frame with respect to the $s^{th}$ local map. $t_{ks}^O$ represents the 3D location coordinates of the $k^{th}$ frame in the $s^{th}$ local map. $R_s^S$ indicates a pitch angle, a heading angle and a roll angle of the $s^{th}$ local map in the local coordinate system and $t_s^S$ represents the 3D location coordinates of the $s^{th}$ local map in the local coordinate system.

In some embodiments, the fusion optimization module 250 may further determine the covariance $\Lambda^O$ of the residual $r_{ks}^O$ in the local coordinate system. Specifically, assuming that the uncertainty of the local positioning information is evenly distributed among all frames within the sliding window, the covariance $\Lambda^O$ of the residual $r_{ks}^O$ in the local coordinate system may be a predetermined constant diagonal matrix. In some embodiments, the fusion optimization module 250 may determine the third likelihood value $P(z_{ks}^O|x_k^L,x_s^S)$ based on the residual $r_{ks}^O$ and the covariance $\Lambda^O$ according to the above equation (6).

In some embodiments, the fourth likelihood value $P(z_k^I|x_k^L,x_{k-1}^L)$ may be determined in a similar manner to the second likelihood value as described above, which will not be repeated herein again.

In some embodiments, the fusion optimization module 250 may optimize an initial positioning result provided by the LiDAR inertial odometry 240 by maximizing the posterior probability as shown in the equation (5), to derive a final positioning result 101 of the device 110 at the current time. In some embodiments, the optimized positioning result 101, for example, may indicate an optimized pose $x_k^L$ of the device 110 at the current time in the local coordinate system. The maximum posterior estimation problem as shown in the equations (5) and (6) can be transformed into another problem for finding a minimum value of the sum of squares of respective residuals, and then can be solved by using an iterative algorithm.

It can be seen from the above description that, compared with the traditional schemes, embodiments of the present disclosure have following advantages: first, instead of the two-dimensional (2D) occupancy grid map used in the traditional schemes, embodiments of the present disclosure adopt a three-dimensional (3D) occupancy grid map as a local map for matching with the point cloud data, thereby implementing a full 6 Degrees of Freedom (DOFs) radar inertial odometry; second, embodiments of the present disclosure provide relative constraints for pose estimates between frames using the integration result of the inertial measurement data and simultaneously implement motion compensation for the radar scan distortion caused by motion; third, the LiDAR reflection information is incorporated into the grid of the local map and the LiDAR reflection information is utilized when the local map is matching with the current frame; fourth, local maps with different resolutions are introduced to improve stability and precision for the matching process between the point cloud data and the local maps.

Figure 3:
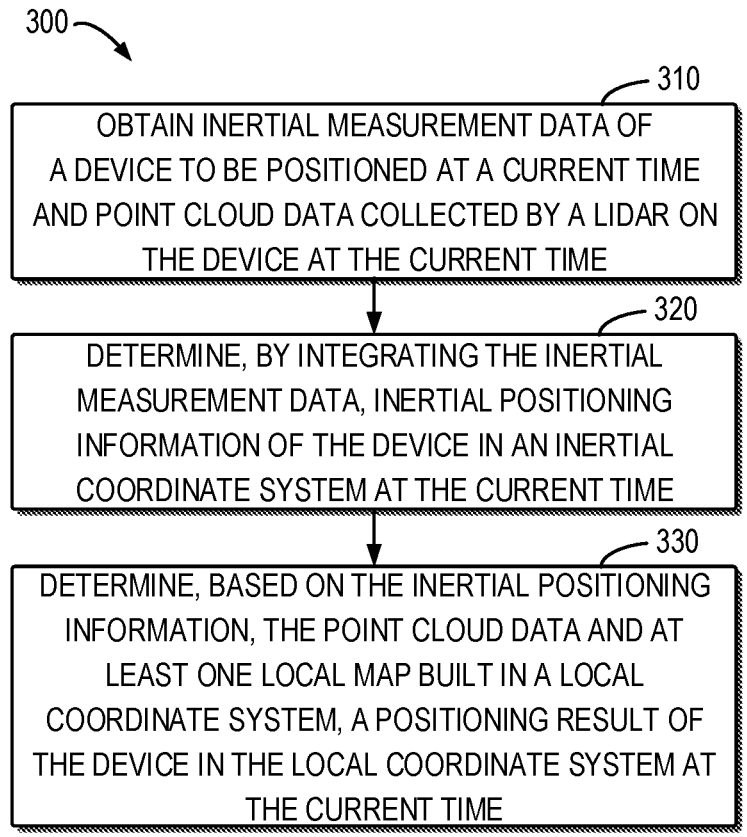
FIG. 3 illustrates a flowchart of a positioning process according to embodiments of the present disclosure.

FIG. 3 illustrates a flowchart of a positioning process 300 according to embodiments of the present disclosure. The process 300 may be implemented by the computing device 120 as shown in FIG. 1. For example, the computing device 120 may be embedded in the device 110 or implemented as an independent device external to the device 110. For ease of discussion, the process 300 will be described with reference to FIG. 2.

At block 310, the computing device 120, e.g., the preprocessing module 230, obtains inertial measurement data of the device 110 to be positioned at a current time and point cloud data collected by the LiDAR 220 on the device 110 at the current time.

At block 320, the computing device 120, e.g., the inertial integration unit 231, determines, by integrating the inertial measurement data, inertial positioning information of the device 110 in an inertial coordinate system at the current time.

At block 330, the computing device 120, e.g., the LiDAR inertial odometry 240, determines, based on the inertial positioning information, the point cloud data and at least one local map built in the local coordinate system, a positioning result 101 of the device 110 in the local coordinate system at the current time.

In some embodiments, the computing device 120, e.g., the LiDAR inertial odometry 240, may determine a first posterior probability associated with the positioning result 101 based on a historical positioning result of the device 110 at a historical time, the point cloud data, the inertial positioning information and the at least one local map; and determine the positioning result 101 by maximizing the first posterior probability.

In some embodiments, the computing device 120, e.g., the LiDAR inertial odometry 240, may determine a first likelihood value of the point cloud data with respect to the positioning result 101 and the at least one local map; determine a second likelihood value of the inertial positioning information with respect to the positioning result 101 and the historical positioning result; and determine, based on the first likelihood value and the second likelihood value, the first posterior probability.

In some embodiments, the at least one local map comprises a plurality of local maps having different resolutions. The computing device 120, e.g., the LiDAR inertial odometry 240, may determine, for a given local map of the plurality of local maps, a likelihood value of the point cloud data with respect to the positioning result 101 and the given local map; and determine the first likelihood value based on a plurality of likelihood probabilities determined for the plurality of local maps.

In some embodiments, the point cloud data comprises respective reflection information of a plurality of laser points and the at least one local map comprises a 3D local map, where the 3D local map is divided into a plurality of grids, each grid having corresponding laser reflection information and obstacle occupancy probability. The computing device 120, e.g., the LiDAR inertial odometry 240, may determine, from the plurality of grids, a group of grids hit by the plurality of laser points by matching the point cloud data with the 3D local map; and determine, based on a group of obstacle occupancy probabilities corresponding to the group of grids, laser reflection information corresponding to the group of grids and respective reflection information of the plurality of laser points in the point cloud data, the first likelihood value of the point cloud data with respect to the positioning result and the 3D local map.

In some embodiments, the computing device 120, e.g., the motion compensation unit 232, may perform, prior to determining the positioning result 101, motion compensation on the point cloud data based on the inertial positioning information.

In some embodiments, the computing device 120, e.g., the fusion optimization module 250, may optimize, in response to the positioning result 101 being determined, the positioning result 101 based on at least the inertial positioning information.

In some embodiments, the positioning result 101 indicates a relative pose of the point cloud data relative to the at least one local map, a first pose of the device in the local coordinate system and a second pose of the at least one local map in the local coordinate system. The computing device 120, e.g., the fusion optimization module 250, may optimize the first pose and the second pose while keeping the relative pose unchanged.

In some embodiments, the computing device 120, e.g., the fusion optimization module 250, may determine a second posterior probability associated with a group of positioning results of the device, wherein the group of positioning results comprise at least the positioning result of the device at the current time and a historical positioning result of the device in the local coordinate system at a historical time; and optimize the positioning result 101 by maximizing the second posterior probability.

In some embodiments, the computing device 120, e.g., the fusion optimization module 250, may determine a third likelihood value associated with the positioning result 101; determine a fourth likelihood value of the inertial positioning information with respect to the positioning result 101 and the historical positioning result; and determine the second posterior probability based on at least the third likelihood value and the fourth likelihood value.

In some embodiments, the computing device 120, e.g., the fusion optimization module 250, may determine, based on the first pose and the second pose, an estimate for the relative pose; determine a residual between the estimate and the relative pose indicated by the positioning result 101; and determine, based on at least the residual, the third likelihood value of the relative pose with respect to the first pose and the second pose.

In some embodiments, the computing device 120, e.g., the fusion optimization module 250, may determine a fifth likelihood value associated with the historical positioning result; determine a sixth likelihood value associated with historical inertial positioning information of the device in the inertial coordinate system at the historical time; and determine the second posterior probability based on at least the third likelihood value, the fourth likelihood value, the fifth likelihood value and the sixth likelihood value.

In some embodiments, the at least one local map is built based on at least one frame of point cloud data collected by the LiDAR 220 at historical times prior to the current time. The computing device 120, e.g., the LiDAR inertial odometry 240, may update the at least one local map based on the point cloud data.

Figure 4:
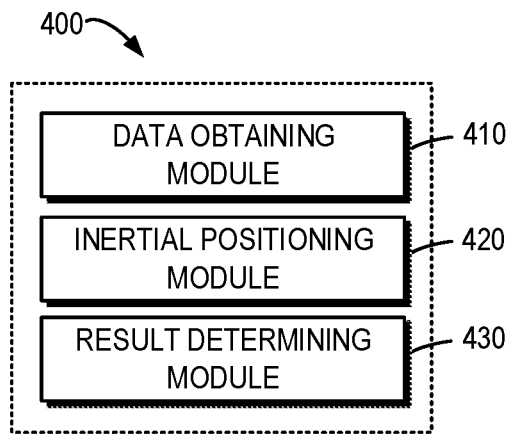
FIG. 4 illustrates a schematic block diagram of a positioning apparatus according to embodiments of the present disclosure.

FIG. 4 illustrates a schematic block diagram of a positioning apparatus 400 according to embodiments of the present disclosure. The apparatus 400 may be included in or implemented as the computing device 120 as shown in FIG. 1. As shown in FIG. 4, the apparatus 400 may comprise a data obtaining module 410 configured to obtain inertial measurement data of a device to be positioned at a current time and point cloud data collected by a LiDAR on the device at the current time. The apparatus 400 may further comprise an inertial positioning module 420 configured to determine, by integrating the inertial measurement data, inertial positioning information of the device in an inertial coordinate system at the current time. The apparatus 400 may further comprise a result determining module 430 configured to determine, based on the inertial positioning information, the point cloud data and at least one local map built in a local coordinate system, a positioning result of the device in the local coordinate system at the current time.

In some embodiments, the result determining module 430 comprises: a first posterior probability determining unit configured to determine a first posterior probability associated with the positioning result based on a historical positioning result of the device at a historical time, the point cloud data, the inertial positioning information and the at least one local map; and a result determining unit configured to determine the positioning result by maximizing the first posterior probability.

In some embodiments, the first posterior probability determining unit comprises: a first determining subunit configured to determine a first likelihood value of the point cloud data with respect to the positioning result and the at least one local map; a second determining subunit configured to determine a second likelihood value of the inertial positioning information with respect to the positioning result and the historical positioning result; and a third determining subunit configured to determine, based on the first likelihood value and the second likelihood value, the first posterior probability.

In some embodiments, the at least one local map comprises a plurality of local maps having different resolutions, and the first determining subunit is configured to: determine, for a given local map of the plurality of local maps, a likelihood value of the point cloud data with respect to the positioning result and the given local map; and determine the first likelihood value based on a plurality of likelihood probabilities determined for the plurality of local maps.

In some embodiments, the point cloud data comprises respective reflection information of a plurality of laser points and the at least one local map comprises a 3D local map, where the 3D local map is divided into a plurality of grids, each grid having corresponding laser reflection information and obstacle occupancy probability. The first determining subunit is configured to determine, from the plurality of grids, a group of grids hit by the plurality of laser points by matching the point cloud data with the 3D local map; and determine, based on a group of obstacle occupancy probabilities corresponding to the group of grids, laser reflection information corresponding to the group of grids and respective reflection information of the plurality of laser points in the point cloud data, the first likelihood value of the point cloud data with respect to the positioning result and the 3D local map.

In some embodiments, the apparatus 400 may further comprise: a motion compensation module configured to perform, prior to determining the positioning result, motion compensation on the point cloud data based on the inertial positioning information.

In some embodiments, the apparatus 400 may further comprise: a result optimization module configured to optimize, in response to the positioning result being determined, the positioning result based on at least the inertial positioning information.

In some embodiments, the positioning result indicates a relative pose of the point cloud data relative to the at least one local map, a first pose of the device in the local coordinate system and a second pose of the at least one local map in the local coordinate system. The result optimization module is configured to optimize the first pose and the second pose while keeping the relative pose unchanged.

In some embodiments, the result optimization module comprises: a second posterior probability determining unit configured to determine a second posterior probability associated with a group of positioning results of the device, wherein the group of positioning results comprise at least the positioning result of the device at the current time and a historical positioning result of the device in the local coordinate system at a historical time; and a result optimization unit configured to optimize the positioning result by maximizing the second posterior probability.

In some embodiments, the second posterior probability determining unit comprises: a fourth determining subunit configured to determine a third likelihood value associated with the positioning result; a fifth determining subunit configured to determine a fourth likelihood value of the inertial positioning information with respect to the positioning result and the historical positioning result; and a sixth determining subunit configured to determine the second posterior probability based on at least the third likelihood value and the fourth likelihood value.

In some embodiments, the fourth determining subunit is configured to determine, based on the first pose and the second pose, an estimate for the relative pose; determine a residual between the estimate and the relative pose indicated by the positioning result; and determine, based on at least the residual, the third likelihood value of the relative pose with respect to the first pose and the second pose.

In some embodiments, the fourth determining subunit is further configured to determine a fifth likelihood value associated with the historical positioning result. The fifth determining subunit is further configured to determine a sixth likelihood value associated with historical inertial positioning information of the device in the inertial coordinate system at the historical time. The sixth determining subunit is further configured to determine the second posterior probability based on at least the third likelihood value, the fourth likelihood value, the fifth likelihood value and the sixth likelihood value.

In some embodiments, the at least one local map is built based on at least one frame of point cloud data collected by the LiDAR at historical times prior to the current time. The apparatus 400 may further comprise: a map updating module configured to update the at least one local map based on the point cloud data.

Figure 5:
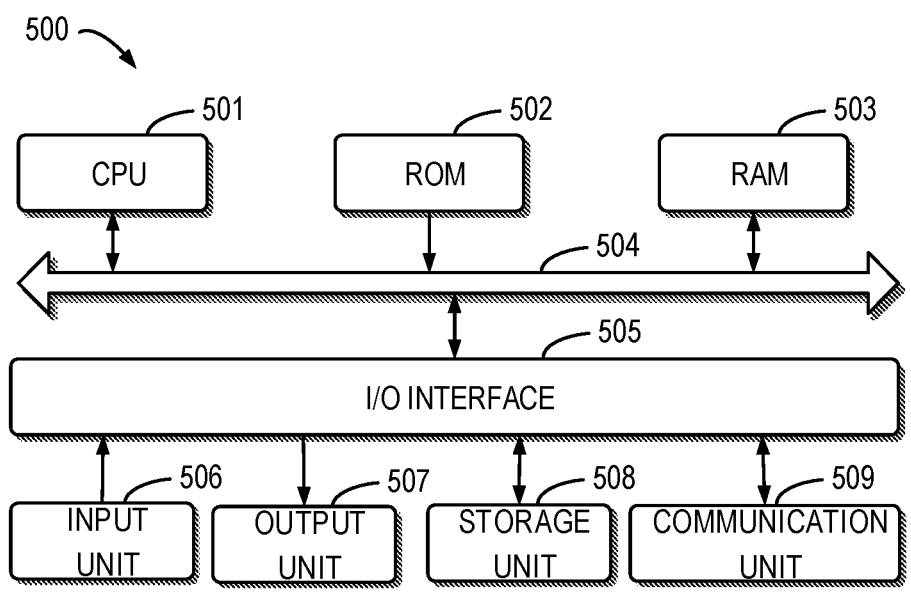
FIG. 5 illustrates a schematic block diagram of a computing device capable of implementing embodiments of the present disclosure.

FIG. 5 shows a schematic block diagram of an example device 500 that may be used to implement embodiments of the present disclosure. The device 500 may be used to implement the computing device 120 as shown in FIG. 1. As shown, the device 500 comprises a central processing unit (CPU) 501 which is capable of performing various proper actions and processes in accordance with computer programs instructions stored in a read only memory (ROM) 502 and/or computer program instructions uploaded from a storage unit 508 to a random access memory (RAM) 503. In the RAM 503, various programs and data needed in operations of the device 500 may be stored. The CPU 501, the ROM 502 and the RAM 503 are connected to one another via a bus 504. An input/output (I/O) interface 505 is also connected to the bus 504.

Multiple component in the device 500 are connected to the I/O interface 505: an input unit 506 including a keyboard, a mouse, or the like; an output unit 507, e.g., various displays and loudspeakers; a storage unit 508 such as a magnetic disk, an optical disk or the like; and a communication unit 509 such as a network card, a modem, a radio communication transceiver. The communication unit 509 allows the apparatus 500 to exchange information/data with other devices via a computer network such as Internet and/or various telecommunication networks.

The processing unit 501 performs various methods and processes described above, such as the process 400. For example, in some embodiments, the process 400 may be implemented as a computer software program that is tangibly embodied on a machine-readable medium, such as the storage unit 508. In some embodiments, part or all of the computer program may be loaded and/or installed on the device 500 via the ROM 502 and/or the communication unit 509. When a computer program is loaded into the RAM 503 and executed by the CPU 501, one or more steps of the process 400 described above may be performed. Alternatively, in other embodiments, the CPU 501 may be configured to perform the process 400 by any other suitable means (e.g., by means of firmware).

The functions described above herein may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on Chip (SOC), Load programmable logic device (CPLD) and so on.

The computer program code for implementing the method of the present disclosure may be complied with one or more programming languages. These computer program codes may be provided to a general-purpose computer, a dedicated computer or a processor of other programmable data processing apparatuses, such that when the program codes are executed by the computer or other programmable data processing apparatuses, the functions/operations prescribed in the flow chart and/or block diagram are caused to be implemented. The program code may be executed completely on a computer, partly on a computer, partly on a computer as an independent software packet and partly on a remote computer, or completely on a remote computer or server.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are depicted in a particular order, it should not be understood that such operations are completed in a particular order as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular implementation of a particular invention. In the present description, some features described in the context of separate embodiments may also be integrated into a single implementation. On the contrary, various features described in the context of a single implementation may also be separately implemented in a plurality of embodiments or in any suitable sub-group.

Although the subject matter has been described in language specific to structural features and/or methodological actions, it should be understood that the subject matters specified in the appended claims are not limited to the specific features or actions described above. Rather, the specific features and actions described above are disclosed as example forms of implementing the claims.

We claim:

1. A method, comprising:
    obtaining inertial measurement data of a device at a first time and point cloud data collected by a LiDAR on the device at the first time;
    determining, by integrating the inertial measurement data, inertial positioning information of the device in an inertial coordinate system at the first time based on the inertial measurement data; and
    determining, based on the inertial positioning information, the point cloud data and at least one local map built in a local coordinate system, a first positioning result of the device in the local coordinate system at the first time,
    wherein the at least one local map is built based on a plurality of frames of historical point cloud data collected by the LiDAR on the device, and
    wherein the determining the first positioning result comprises:
        determining a first posterior probability associated with the first positioning result based on a second positioning result of the device at a second time prior to the first time, the point cloud data, the inertial positioning information, and the at least one local map; and
        determining the first positioning result by maximizing the first posterior probability.

2. The method of claim 1, wherein the determining the first posterior probability comprises:
    determining a first likelihood value of the point cloud data with respect to the first positioning result and the at least one local map;
    determining a second likelihood value of the inertial positioning information with respect to the first positioning result and the second positioning result; and
    determining, based on the first likelihood value and the second likelihood value, the first posterior probability.

3. The method of claim 2, wherein the at least one local map comprises a plurality of local maps having different resolutions, and the determining the first likelihood value comprises:
    determining, for a local map of the plurality of local maps, a likelihood value of the point cloud data with respect to the first positioning result and the local map; and
    determining the first likelihood value based on a plurality of likelihood values determined for the plurality of local maps.

4. The method of claim 2, wherein:
    the point cloud data comprises respective reflection information of a plurality of laser points,
    the at least one local map comprises a 3D local map, the 3D local map including a plurality of grids, each grid having corresponding laser reflection information and obstacle occupancy probability, and
    the determining the first likelihood value comprises:
        determining, from the plurality of grids, a group of grids hit by the plurality of laser points by matching the point cloud data with the 3D local map; and
        determining, based on a group of obstacle occupancy probabilities corresponding to the group of grids, laser reflection information corresponding to the group of grids and respective reflection information of the plurality of laser points in the point cloud data, the first likelihood value of the point cloud data with respect to the first positioning result and the 3D local map.

5. The method of claim 1, further comprising:
    prior to the determining the first positioning result, performing motion compensation on the point cloud data based on the inertial positioning information.

6. The method of claim 1, further comprising:
    in response to the first positioning result being determined, optimizing the first positioning result based on at least the inertial positioning information.

7. The method of claim 6, wherein the first positioning result includes a relative pose of the point cloud data relative to the at least one local map, a first pose of the device in the local coordinate system and a second pose of the at least one local map in the local coordinate system, and the optimizing the first positioning result comprises:
    optimizing the first pose and the second pose while keeping the relative pose unchanged.

8. The method of claim 7, wherein the optimizing the first positioning result comprises:
    determining a second posterior probability associated with a group of positioning results of the device, wherein the group of positioning results comprises at least the first positioning result of the device at the first time and a second positioning result of the device in the local coordinate system at a second time prior to the first time; and optimizing the first positioning result by maximizing the second posterior probability.

9. The method of claim 8, wherein the determining the second posterior probability comprises:
   determining a third likelihood value associated with the first positioning result;
   determining a fourth likelihood value of the inertial positioning information with respect to the first positioning result and the second positioning result; and
   determining the second posterior probability based on at least the third likelihood value and the fourth likelihood value.

10. The method of claim 9, wherein the determining the third likelihood value comprises:
    determining, based on the first pose and the second pose, an estimate for the relative pose;
    determining a residual between the estimate and the relative pose indicated by the first positioning result; and
    determining, based on at least the residual, the third likelihood value of the relative pose with respect to the first pose and the second pose.

11. The method of claim 9, wherein the determining the second posterior probability comprises:
    determining a fifth likelihood value associated with the second positioning result;
    determining a sixth likelihood value associated with a second inertial positioning information of the device in the inertial coordinate system at the second time; and
    determining the second posterior probability based on at least the third likelihood value, the fourth likelihood value, the fifth likelihood value and the sixth likelihood value.

12. The method of claim 1, further comprising:
    updating the at least one local map based on the point cloud data.

13. A computing device, comprising:
    one or more processors; and
    a memory for storing one or more programs, which, when executed by the one or more processors, cause the computing device to perform acts including:
       obtaining inertial measurement data of a device at a first time and point cloud data collected by a LiDAR on the device at the first time;
       determining, by integrating the inertial measurement data, inertial positioning information of the device in an inertial coordinate system at the first time; and
       determining, based on the inertial positioning information, the point cloud data and at least one local map built in a local coordinate system, a first positioning result of a first pose of the device in the local coordinate system at the first time,
    wherein the at least one local map is built based on a plurality of frames of historical point cloud data collected by the LiDAR on the device, and
    wherein the determining the first positioning result comprises:
       determining a first posterior probability associated with the first positioning result based on a second positioning result of the device at a second time prior to the first time, the point cloud data, the inertial positioning information, and the at least one local map; and
       determining the first positioning result maximizing the first posterior probability.

14. The computing device of claim 13, wherein the determining the first posterior probability comprises:
    determining a first likelihood value of the point cloud data with respect to the first positioning result and the at least one local map;
    determining a second likelihood value of the inertial positioning information with respect to the first positioning result and the second positioning result; and
    determining, based on the first likelihood value and the second likelihood value, the first posterior probability.

15. The computing device of claim 13, wherein the acts further comprise:
    prior to the determining the first positioning result, performing motion compensation on the point cloud data based on the inertial positioning information.

16. The computing device of claim 13, wherein the acts further comprise:
    optimizing the first positioning result based on at least the inertial positioning information.

17. The computing device of claim 13, wherein the acts further comprise:
    updating the at least one local map based on the point cloud data.

18. A computer-readable storage medium having stored thereon a computer program that, when executed by a computing device, causes the computing device to perform:
    obtaining inertial measurement data of an object at a first time and point cloud data collected by a LiDAR on the object at the first time;
    determining, by integrating the inertial measurement data, inertial positioning information of the device in an inertial coordinate system at the first time based on the inertial measurement data; and
    determining a pose of the object in a local coordinate system at the first time based on the inertial positioning information, the point cloud data, and at least one local map built in the local coordinate system,
    wherein the at least one local map is built based on a plurality of frames of historical point cloud data collected by the LiDAR on the device, and
    wherein the determining the first positioning result comprises:
       determining a first posterior probability associated with the first positioning result based on a second positioning result of the device at a second time prior to the first time, the point cloud data, the inertial positioning information, and the at least one local map; and
       determining the first positioning result by maximizing the first posterior probability.

* * * * *